US011632669B2

(12) United States Patent
Xu et al.

(10) Patent No.: US 11,632,669 B2
(45) Date of Patent: Apr. 18, 2023

(54) INFORMATION PROCESSING METHOD (71) Applicant: GUANGDONG OPPO MOBILE TELECOMMUNICATIONS CORP., LTD., Guangdong (CN)

(72) Inventors: Yang Xu, Guangdong (CN); Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/096,220

(22) Filed: Nov. 12, 2020

(65) Prior Publication Data
US 2021/0067949 A1 Mar. 4, 2021

Related U.S. Application Data (63) Continuation of application No. PCT/CN2018/109182, filed on Sep. 30, 2018.

(51) Int. Cl.
| | |
|---|---|
| *H04W 8/22* | (2009.01) |
| *H04W 48/16* | (2009.01) |
| *H04W 48/18* | (2009.01) |
| *H04W 76/11* | (2018.01) |
| *H04W 80/02* | (2009.01) |
| *H04W 84/12* | (2009.01) |
| *H04W 8/06* | (2009.01) |
| *H04W 8/20* | (2009.01) |
| *H04W 76/12* | (2018.01) |

(Continued)

(52) U.S. Cl.
CPC ............ *H04W 8/22* (2013.01); *H04W 48/16* (2013.01); *H04W 48/18* (2013.01); *H04W 76/11* (2018.02); *H04W 80/02* (2013.01); *H04W 84/12* (2013.01)

(58) Field of Classification Search
CPC ....... H04W 8/22; H04W 48/16; H04W 48/18; H04W 76/11; H04W 80/02; H04W 84/12; H04W 8/06; H04W 8/205; H04W 76/12; H04W 8/20; H04W 72/04; H04W 8/08; H04W 8/24; H04W 24/02; H04W 24/08; H04W 28/10; H04W 60/00
USPC ......................................................... 370/338
See application file for complete search history.

(56) References Cited

U.S. PATENT DOCUMENTS

| | | |
|---|---|---|
| 2008/0184325 A1 | 7/2008 | Yang et al. |
| 2011/0310896 A1 | 12/2011 | Cheng et al. |

(Continued)

FOREIGN PATENT DOCUMENTS

| | | |
|---|---|---|
| CN | 101730192 A | 6/2010 |
| CN | 103813380 A | 5/2014 |

(Continued)

OTHER PUBLICATIONS

SA WG2 Meeting #128bis, S2-188754, Aug. 20-24, 2018, Sophia-Antipolis, France. (Year: 2018).*

(Continued)

*Primary Examiner* — Inder P Mehra
(74) *Attorney, Agent, or Firm* — Perkins Coie LLP (57) ABSTRACT

An information processing method is provided. The method comprises: reporting UE policy information corresponding to at least one network identifier to a network side, wherein the at least one network identifier is a network identifier corresponding to part of UE policy information currently stored in the terminal device.

8 Claims, 5 Drawing Sheets

(51) Int. Cl.
*H04W 72/04* (2023.01)
*H04W 8/08* (2009.01)
*H04W 8/24* (2009.01)
*H04W 24/02* (2009.01)
*H04W 24/08* (2009.01)
*H04W 28/10* (2009.01)
*H04W 60/00* (2009.01)

(56) References Cited

U.S. PATENT DOCUMENTS

2014/0241333 A1   8/2014   Kim et al.
2015/0319662 A1   11/2015  Enomoto et al.
2016/0360476 A1   12/2016  Kim et al.
2017/0374695 A1*  12/2017  Lau ..................... H04W 76/11

FOREIGN PATENT DOCUMENTS

| | | |
|---|---|---|
| CN | 103141133 B | 1/2016 |
| CN | 105325025 A | 2/2016 |
| CN | 106162735 A | 11/2016 |
| CN | 107291909 A | 10/2017 |
| CN | 107360216 A | 11/2017 |
| CN | 107547431 A | 1/2018 |
| CN | 108171822 A | 6/2018 |
| RU | 2580448 C2 | 4/2016 |
| RU | 2016138674 A | 4/2018 |
| WO | 2008138196 A1 | 11/2008 |
| WO | 2014166095 A1 | 10/2014 |

OTHER PUBLICATIONS

Nokia et al: "Discussion on UE policy management and distribution",3GPP Draft; S2-186605. 3 pages.
Nokia, Nokia Shanghai Bell "SBI friendly UE policy delivery procedure" 3GPP TSG-SA WG2 Meeting #128 Bis S2-187940 Sophia-Antipolis, France, 2018. 15 pages.
Qualcomm Incorporated/Lena "UE policy delivery in 5GS" 3GPP TSG CT WG1 Meeting #110 C1-182184 Kunming (P.R. of China),2018. 3 pages.
Second Office Action of the Chinese application No. 202010690399. 6, dated Jan. 11, 2022. 20 pages with English translation.
Supplementary European Search Report in the European application No. 18934866.7, dated Nov. 19, 2021. 12 pages.
3GPP TS 23.503 V15.3.0 (Sep. 2018), 3rd Generation Partnership Project; Technical Specification Group Services and System Aspects; Policy and Charging Control Framework for the 5G System Stage 2 (Release 15).
International Search Report in the international application No. PCT/CN2018/109182, dated Jun. 13, 2019.
Oppo et al. "Correction on UE Policy Delivery" SA WG2 Meeting #128bis S2-188754, Aug. 26, 2018 (Aug. 26, 2018), section 6.1.2. 2.2.
Nokia et al. "Alignment with 23502 for SBI friendly UE Policy Distribution" 3GPP TSG-SA WG2 Meeting #128 Bis S2-188968, Aug. 26, 2018 (Aug. 26, 2018), section 6.1.2.2.2.
Oppo. "Clarification on 5G-GUTI in Use during Registration Procedure" SA WG2 Meeting #128 S2-186845, Jun. 26, 2018 (Jun. 26, 2018), entire document.
First Office Action of the Russian application No. 2021112306, dated Aug. 26, 2021. 10 pages with English translation.
3GPP TSG-CT WG1 Meeting #111 C1-183559, Osaka (Japan), May 21-25, 2018, Source: Qualcomm Incorporated, Ericsson?, CATT?, Title: Contents of UE policy container and processing of UE policy sections, Spec: 3GPP TS 24.501 v1.1.1, Agenda item: 15.2.2.3, Document for: Agreement. 14 pages.
SA WG2 Meeting #127 S2-184616, Apr. 16-20, 2018, Sanya, China, Title: Clarification on using PSI, Source to WG: OPPO, China Unicom, Source to TSG: SA2, Work item code: 5GS_Ph1. 3 pages.
First Office Action of the Chinese application No. 202010690399.6, dated Sep. 23, 2021. 28 pages with English translation.
Written Opinion of the International Search Authority in the international application No. PCT/CN2018/109182, dated Jun. 13, 2019. 7 pages with English translation.
First Office Action of the European application No. 18934866.7, dated Jul. 20, 2022. 10 pages.
Notice of Allowance of the Chinese application No. 202010690399. 6, dated Mar. 16, 2022. 6 pages with English Translation.
Written Opinion of the Singaporean application No. 11202103251X, dated Nov. 16, 2022. 11 pages.

* cited by examiner

Reporting UE policy information corresponding to at least one network identifier to a network side, wherein the at least one network identifier is a network identifier corresponding to part of UE policy information currently stored in the terminal device /101

INFORMATION PROCESSING METHOD

CROSS-REFERENCE TO RELATED APPLICATIONS

This is a continuation application of International Patent Application No. PCT/CN2018/109182, filed on Sep. 30, 2018, the disclosure of which is hereby incorporated by reference in its entirety.

BACKGROUND

The UE policy includes a WLAN Selection Policy (WLANSP) and a UE Route Selection Policy (URSP). The WLANSP policy is a policy for selecting a service set identifier (SSID) for access to a wireless local area network (WLAN), and the URSP policy is used to select different protocol data unit sessions (PDU sessions). A UE policy update process comprises: a UE actively initiating a UE policy update flow to a network side; or the network side triggering the UE policy update flow when the UE's location, time and other factors change.

However, there lacks a corresponding solution to the storage and management of UE policies at a terminal side.

SUMMARY

The present invention relates to the technical field of communication processing, and in particular to an information processing method.

A first aspect of the embodiments of the present application provides an information processing method, which is applied to a terminal device, the method comprising: reporting UE policy information corresponding to at least one network identifier to a network side, wherein the at least one network identifier is a network identifier corresponding to part of UE policy information currently stored in the terminal device.

The reporting UE policy information corresponding to at least one network identifier to a network side comprises: reporting UE policy information corresponding to a network identifier of a first network to the network side. The first network is a network currently accessed by the terminal device or a network the terminal device currently requests to access.

Alternatively, the reporting UE policy information corresponding to at least one network identifier to a network side comprises one of: reporting UE policy information corresponding to a network identifier of a first network and UE policy information corresponding to a network identifier of a second network to the network side; reporting the UE policy information corresponding to the network identifier of the first network; and reporting the UE policy information corresponding to the network identifier of the second network. The first network is a home network, and the second network is a visited network A second aspect of the embodiments of the present application provides another information processing method, which is applied to a terminal device, the method comprising: receiving at least one piece of UE policy information sent by a network side; and deleting, by the terminal device, a UE policy corresponding to a first type of UE policy information if the at least one piece of UE policy information does not include the first type of UE policy information; or maintaining, by the terminal device, the UE policy corresponding to the first type of UE policy information; wherein the first type of UE policy information corresponds to at least one UE policy stored in the terminal device.

A third aspect of the embodiments of the present application provides another information processing method, which is applied to a terminal device, the method comprising: deleting at least one currently stored UE policy when a UE policy is acquired.

DETAILED DESCRIPTION

In order to understand the features and technical contents of the embodiments of the present invention in more detail, the implementation of the embodiments of the present invention will be described in detail below in conjunction with the accompanying drawings. The accompanying drawings are merely for reference and illustration, and are not intended to limit the embodiments of the present invention.

Embodiment I

Figure 1:
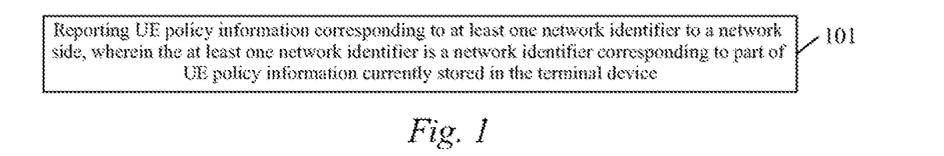
FIG. 1 is a schematic diagram of a first flow of an information processing method in an embodiment of the present application.

An embodiment of the present application provides an information processing method, which is applied to a terminal device, and as shown in FIG. 1, the method comprises:

step 101: reporting UE policy information corresponding to at least one network identifier to a network side, wherein the at least one network identifier is a network identifier corresponding to part of UE policy information currently stored in the terminal device.

In an embodiment of the present application, a UE reports UE policy information stored in itself, in order to apply to a network side to update currently stored UE policys. Specifically, based on the received UE policy information, the network side delivers, to the terminal, UE policy information that is to participate in the updating of UE policies; then the terminal side updates or manages the policies based on the received policy information. Here, the UE policy information reported by the terminal side comprises at least a UE policy section identifier. Before further illustration of the reporting method of the present application, the update flow of UE policies will be exemplified first.

The updating of UE policies is divided into two cases, one being that the UE actively initiates a UE policy update flow to the network side; and the second one being that a UE policy update flow is triggered by the network side when the UE's location, time and other factors change.

Figure 2:
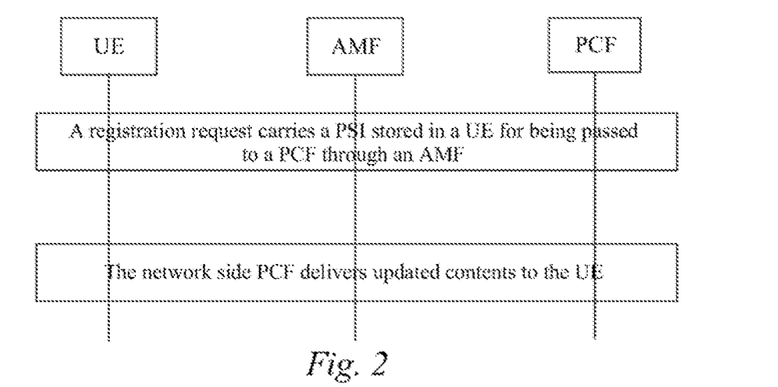
FIG. 2 is a schematic diagram of a first update flow of UE policies in an embodiment of the present application.

As shown in FIG. 2, when the UE initiates a registration request to the network side, which carries at least a UE policy section identifier (PSI) stored in the UE for being passed to a network side policy control function (PCF) through an authentication management function (AMF), the network side PCF delivers updated contents of the UE policy to the UE according to the received PSI.

Figure 3:
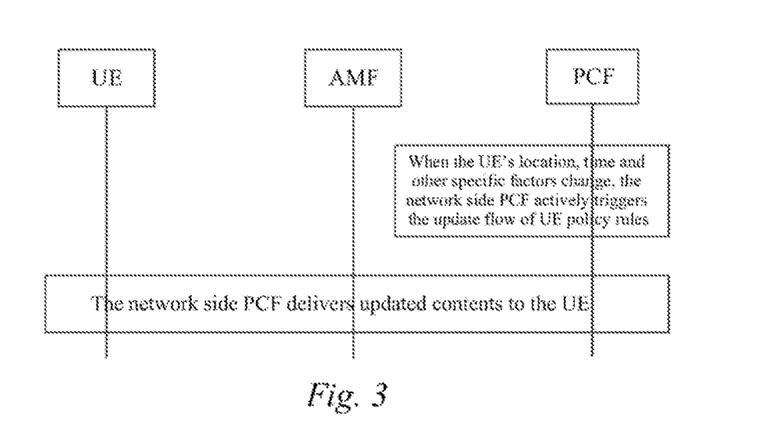
FIG. 3 is a schematic diagram of a second update flow of UE policies in an embodiment of the present application.

As shown in FIG. 3, when the UE's location, time and other specific factors change, the network side PCF actively triggers the update flow of UE policies. Specifically, the PCF checks the latest list of PSIs to decide which updated contents of the UE policy are delivered to the UE, the PCF passes the updated contents of the UE policy to the UE through the AMF, and the UE uploads the updated results to the PCF through the AMF.

Figure 4:
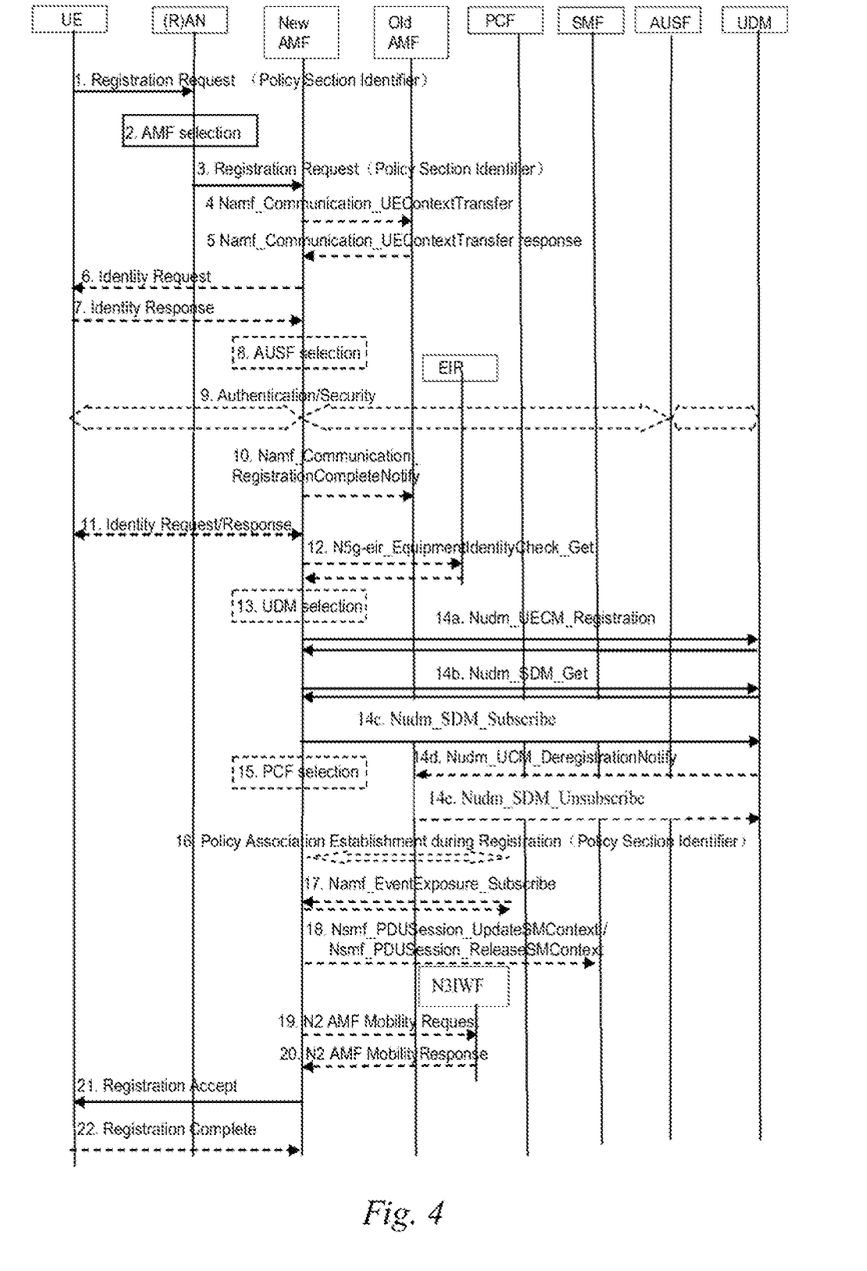
FIG. 4 is a schematic diagram of a terminal registration flow in an embodiment of the present application.

Further, a UE registration flow is given in detail in FIG. 4, in which a UE may carry a PSI stored in itself in a registration request when initiating the registration request to a network side, for simultaneous reporting of same to the network side.

1) A terminal initiates a registration flow (which may be initial registration, or periodic registration, or mobile update registration), wherein the registration request may carry different parameters under different registration types and scenarios, and in the embodiments of the present application, the registration request carries at least one PSI;

2) An access network (RAN) selects a suitable AMF according to the parameters carried in the UE;

3) The access network->a new AMF, in which a Registration-Request message at an Non-Access Stratum (NAS) layer is sent to the new AMF through an N2 message; If there is currently a UE signaling connection for the AS and the AMF, the N2 message is "UPLINK NAS TRANSPORT", otherwise it is "INITIAL UE MESSAGE". If the registration type is periodic registration, steps 4 to 20 can be ignored;

4-5) The new AMF acquires context information of the UE from the old AMF;

6-7) The new AMF acquires ID information from the UE;

8) The AMF selects an authentication server;

9) Authentication process between the UE and a core network;

10) The new AMF notifies the old AMF of the registration result for the terminal;

11) ID acquisition flow Permanent Equipment Identifier (PEI); If the UE does not provide the PEI and cannot acquire it from the old AMF, the new AMF will trigger the ID acquisition flow to acquire the PEI, wherein the PEI should be encrypted for transmission, except for unauthenticated emergency registration;

12) The new AMF requests an Equipment Identity Register (EIR) to check the validity of an MEID;

13) Unified Data Management (UDM) selection;

14a-c) The AMF registers the UE to the UDM; Access and mobile subscription data of the UE, SMF selection subscription data, context information of the UE at an SMF, etc. are acquired from the UDM;

14d) The UDM notifies the old AMF to register the UE, and the old AMF deletes UE context and other information;

14e) The old AMF cancels the relevant subscription of the terminal to the UDM;

15-17) If the AMF does not yet have effective access and mobility policy information of the UE, a suitable PCF is selected to acquire the access and mobility policy information of the UE;

18) PDU Session updating;

19-20) Notifying Non-3GPP Inter Working Function (N3IWF);

21) The new AMF sends a Registration-Accept message to the UE; and

22) The UE replies to the network with a Registration-Complete message, and the UE needs to reply to the Registration-Complete message only when the network has assigned 5G-GUTI to the Registration Accept message or network fragmentation subscription has changed.

In practical applications, the terminal device completes the reporting of the UE policy information when conducting the registration flow above in FIG. 4. Reporting UE policy information to a network side by a terminal device of the present application will be further exemplified below in conjunction with FIGS. 1 to 4.

In practical applications, in order to facilitate the management of UE policies, the UE policies are divided so that different networks correspond to their respective UE policies. Currently, the UE policies are divided into different parts by customizing PSI parameters, i.e. UE policy section identifiers, in order to facilitate the management of the UE policies.

Specifically, a UE policy set is currently stored in the terminal device; and the UE policy set comprises: at least one UE policy, and a UE policy section identifier and a network identifier corresponding to each UE policy, wherein one network identifier corresponds to at least one UE policy section identifier; and one UE policy section identifier corresponds to at least one UE policy. Here, the policy section identifier represents a corresponding policy, and the policy specifically contains contents of the at least one UE policy.

Correspondingly, the UE policy information comprises at least: a UE policy section identifier, and/or at least a part of contents of the UE policy. That is to say, the correlation between the network identifier and the UE policy information comprises: the correlation between the network identifier and the UE policy section identifier, and/or the correlation between the network identifier and the UE policy.

In practical applications, said reporting UE policy information corresponding to at least one network identifier to a network side comprises: reporting at least one network identifier and UE policy information corresponding to the at least one network identifier to the network side.

Figure 5:
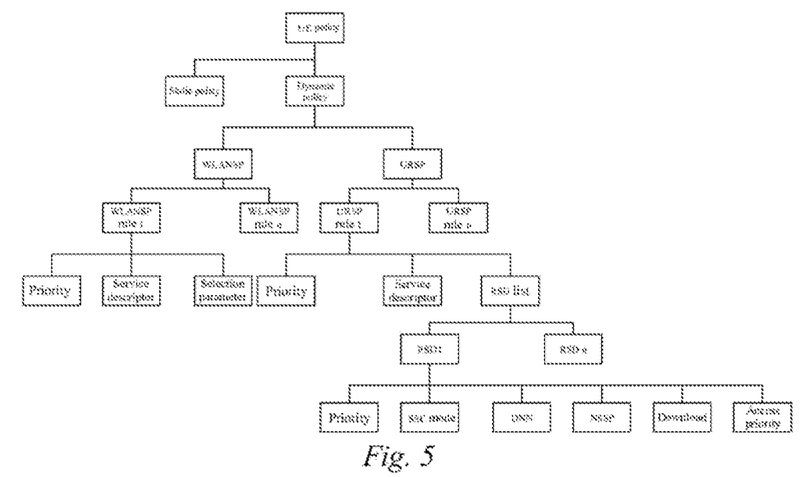
FIG. 5 is a schematic diagram of a first division of a UE policy in an embodiment of the present application.

Reference can be made to FIG. 5 for the correlation between a UE policy and a UE policy, wherein the UE policy may comprise a static policy and a dynamic policy, and the dynamic policy further comprises a WLANSP policy and a URSP policy; multiple rules may be comprised for the URSP therein, such as URSP rule 1 which contains a priority, a service descriptor and an Route Selection Descriptor (RSD) list; the RSD list contains RSD1 to RSDn, wherein RSD1 may further contain the combination of various parameters, such as a priority, an SSC (Session and Service Continuity) mode and a Data Network Name (DNN), and the WLANSP policy may comprise multiple rules, such as WLANSP rule 1 which contains a priority, a service descriptor and a selection parameter.

When UE policy section identifiers correspond to policies, a UE policy section identifier may correspond to at least a part of rules in the URSP policy, and/or at least a part of rules in the WLANSP policy.

Figure 6:
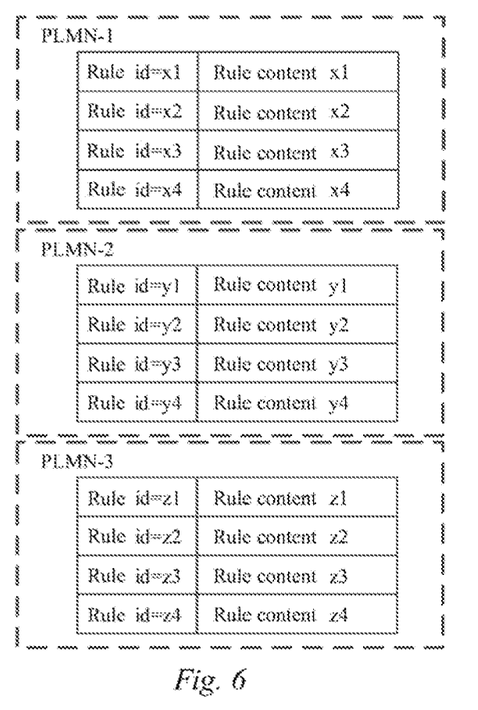
FIG. 6 is a schematic diagram of a second division of a UE policy in an embodiment of the present application.

As shown in FIG. 6, the UE policy set comprises: 12 UE policies, wherein the 12 UE policies are divided into three parts, each part corresponding to one network identifier.

The first network identifier PLMN-1 represents the first network, and PLMN-1 comprises:

policy id=x1 and its corresponding rule content x1;
policy id=x2 and its corresponding rule content x2;
policy id=x3 and its corresponding rule content x3;
policy id=x4 and its corresponding rule content x4.

The second network identifier PLMN-2 represents the second network, and PLMN-2 comprises:

policy id=y1 and its corresponding rule content y1;
policy id=y2 and its corresponding rule content y2;
policy id=y3 and its corresponding rule content y3;
policy id=y4 and its corresponding rule content y4.

The third network identifier PLMN-3 represents the third network, and PLMN-3 comprises:

policy id=z1 and its corresponding rule content z1;
policy id=z2 and its corresponding rule content z2;
policy id=z3 and its corresponding rule content z3;
policy id=z4 and its corresponding rule content z4.

By using the above UE policy division method, all the UE policies stored in the terminal device can be divided, according to the network identifiers and the UE policy section identifiers, into different parts to be managed.

The reporting method for UE policies will be separately described below.

In a first aspect,
said reporting UE policy information corresponding to at least one network identifier to a network side comprises: reporting UE policy information corresponding to a network identifier of a first network to the network side. For example, the first network is a network currently accessed by a terminal device or a network the terminal device currently requests to access, and the first network may also be a network that the terminal device attempts to access.

That is to say, when the terminal device establishes a connection with an access network, only UE policy information corresponding to a network identifier of the access network is reported to the network side, without reporting currently stored UE identifier policies corresponding to network identifiers of other networks.

Specifically, a network identifier of a first network and UE policy information corresponding to the first network are reported to the network side.

The first network may be any of a public land mobile network (PLMN) or a radio access technology (RAT) network, and the terminal device may be any types of mobile terminal devices, such as a mobile phone, a tablet computer, or a smart watch.

In a second aspect,
the method further comprises: reporting the UE policy information corresponding to the network identifier of the first network and UE policy information corresponding to a network identifier of a second network to the network side in a roaming scenario.

Here, the terminal device is switched from a connection state with the first network to a connection state with the second network, which indicates that the terminal device is in a roaming state.

When the terminal device reports the UE policy information corresponding to the network identifier of the first network and the UE policy information corresponding to the network identifier of the second network to the network side, the reported contents may further comprise the network identifier of the first network and the network identifier of the second network.

In practical applications, the first network is a home network, and the second network is a visited network.

Compared with the prior art, in which a UE reports all the currently stored UE policy information when reporting UE policy information to a network side, the above reporting method greatly reduces the occupation of network resources.

In practical applications, step 101 may specifically comprise: reporting UE policy information corresponding to at least one network identifier to a network side, such that the network side updates UE policies stored in a terminal device based on the received UE policy information.

That is to say, the UE can actively report UE policy information corresponding to the currently stored UE policies to the network side, in order to apply to the network side to update the currently stored UE policies. After receiving the UE policy information reported by the UE, the network side can learn about, according to the UE policy information, which UE policies are currently stored in the UE, such that the UE policies at the terminal side are updated according to the current network requirements.

In practical applications, the method further comprises: reporting UE policy information corresponding to at least one network identifier to a network side during the process of establishing a connection with a first network.

Here, said establishing a connection with the first network comprises at least one of: the terminal device initiating a registration flow, the terminal device initiating a service request flow, the terminal device initiating a UE policy request flow, and the terminal device initiating a PDU session establishment flow.

That is to say, when the terminal device initiates any of one or more operation flows above to the network side, it is required to report the UE policy information to the network side.

In some other embodiments, the method further comprises: reporting UE policy information corresponding to at least one network identifier to a network side after a connection with a first network is established successfully.

By using the above-mentioned technical solution, the network identifier is associated with the UE policy information in order to solve the problem with the storage and management of UE policies by a terminal device, and when the terminal device reports UE policy information to a network side, only UE policy information corresponding to one or more specific network identifiers is reported, without reporting all the stored UE policy information to the network side, which greatly reduces the occupation of network resources and improves the data transmission efficiency.

Embodiment II

Figure 7:
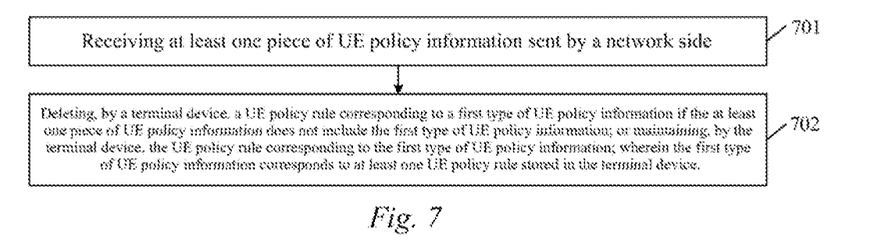
FIG. 7 is a schematic diagram of a second flow of an information processing method in an embodiment of the present application.

In the embodiment of the present application, an information processing method is provided, which is applied to a terminal device, and as shown in FIG. 7, the method specifically comprises:

step 701: receiving at least one piece of UE policy information sent by a network side; and step 702: deleting, by the terminal device, a UE policy corresponding to a first type of UE policy information if the at least one piece of UE policy information does not include the first type of UE policy information; or maintaining, by the terminal device, the UE policy corresponding to the first type of UE policy information; wherein the first type of UE policy information corresponds to at least one UE policy stored in the terminal device.

In the embodiment of the present application, the management flow of UE policies by the terminal device is included in the update flow of UE policies, and before further illustration of the management flow of the present application, the update flow of UE policies is exemplified first.

Figure 8:
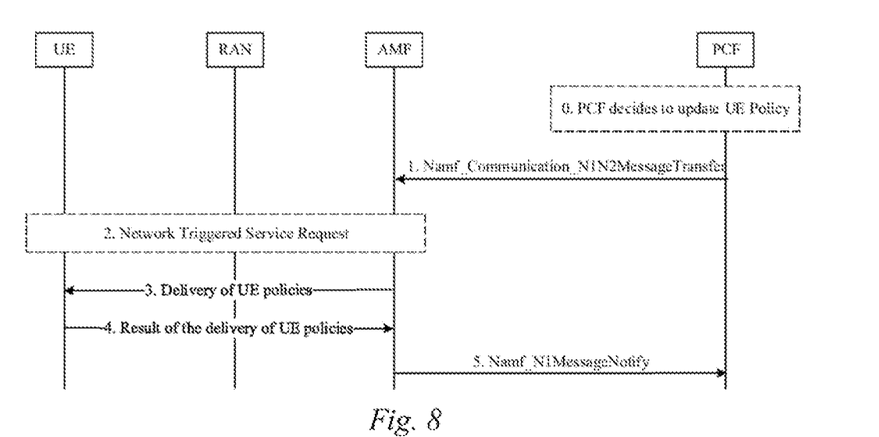
FIG. 8 is a schematic diagram of a third update flow of UE policies in an embodiment of the present application.

As shown in FIG. 8, the update flow of UE policies specifically comprises:

0) a network side PCF starts a update flow of UE policies; 1) the PCF invokes an Namf_Communication_N1N2MessageTransfer service provided by an AMF; 2) the network side AMF triggers a service request and starts a paging process; 3) the AMF passes updated contents of the UE policies received from the PCF through to a UE; 4) the UE returns updated result response to the AMF; and 5) the AMF invokes an Namf_N1MessageNotify service, and forwards the UE's response to the PCF.

How the terminal device of the present application specifically manages the stored UE policies will be further exemplified below in conjunction with FIGS. 7 to 8.

Here, at least one piece of UE policy information does not include a first type of UE policy information, which means that the network side sends only part of UE policy information currently stored in the terminal, but does not send another part of the UE policy information currently stored in the terminal. For example, the policy section identifiers currently stored in the terminal are 1 to m, and the policy section identifiers delivered by the network side are 1 to n, where n is less than m; therefore, the terminal deletes or maintains UE policies corresponding to the policy section identifiers of n+1 to m.

In some embodiments, the method may further comprise: receiving a first identifier sent by the network side, wherein the first identifier is used for indicating the execution of: deleting, by the terminal device, the UE policy corresponding to the first type of UE policy information; or maintaining, by the terminal device, the UE policy corresponding to the first type of UE policy information.

That is to say, if the network side sends only part of UE policy information currently stored in the terminal, but does not send another part of the UE policy information currently stored in the terminal, which type of operation is specifically performed on the UE policy corresponding to the UE policy information that is not sent is indicated by a first identifier, wherein the first identifier indicates deleting or maintaining.

It should be noted that the solution provided in this embodiment includes several processing methods as follows:

the first one is deleting, after a UE policy information sent by a network side is received, all the policies corresponding to other pieces of UE policy information that are not sent by the network side; and the other one is finding out, after a UE policy information sent by a network side is received, a PLMN identifier (the PLMN identifier being a network identifier) to be processed and corresponding to a UE policy section identifier, and deleting the UE policy section identifier under the PLMN identifier to be processed. For example, if PLMN 1 currently stores policy section identifiers 1 and 2, PLMN2 stores policy section identifiers 1, 2 and 3, and UE policy section identifiers 2 and 3 are received at this time, it is found that the UE policy section identifiers correspond to PLMN2, so that a rule corresponding to the policy section identifier 1 in PLMN2 is deleted, without processing on PLMN1.

In the embodiment of the present application, the maintaining operation may be a non-execution operation, that is to say, no operation is performed on the first type of UE identifier and its corresponding UE policy.

Here, in order to facilitate the management of the UE policies, the UE policies are divided so that different networks correspond to their respective UE policies.

Specifically, a UE policy set is currently stored in the terminal device; and the UE policy set comprises: at least one UE policy, and a UE policy section identifier and a network identifier corresponding to each UE policy, wherein one network identifier corresponds to at least one UE policy section identifier; and one UE policy section identifier corresponds to at least one UE policy. Moreover, different network identifiers may correspond to the same or different UE policy section identifiers, and different network identifiers may also correspond to the same or different rules.

It should be noted that the operations performed by the terminal device based on the received UE policy information in this embodiment include several processing methods as follows:

the first one is the terminal device performing a management operation on all the UE policies under a network identifier corresponding to the received UE policy information;

a further one is the terminal device performing a management operation on a part of the UE policies under a network identifier corresponding to the received UE policy information; and a still further one is the terminal device performing, for the received UE policy information and a network identifier, a management operation on the UE policy(s) under the network identifier that corresponds to the UE policy information.

In some embodiments, the UE policy information may further comprise: first indication information, wherein the first indication information is used for indicating a management operation performed on the UE policy(s) corresponding to the UE policy information.

Further, after said receiving at least one piece of UE policy information sent by a network side, the method further comprises: performing, based on first indication information corresponding to each of the at least one piece of UE policy information, a management operation on a UE policy corresponding to each piece of UE policy information.

That is to say, when updating the UE policies stored in the terminal side, the network side also carries the first indication information in the delivered information to define the management operation performed on the corresponding UE policy. As such, it is avoided that the terminal, after receiving updated information delivered by the network side, cannot determine the operation to be performed.

Exemplarily, the management operation involves: deleting, overwriting or maintaining.

In practical applications, an approach of adding the first indication information comprises: adding the first indication information to the UE policy information, with a granularity of a single piece of UE policy information or all of a plurality of pieces of UE policy information.

That is to say, different pieces of first indication information are respectively added to different pieces of UE policy information; or by taking at least two pieces of UE policy information as a whole, the same piece of first indication information is added to the at least two pieces of UE policy information.

Separately, when at least one piece of UE policy information individually corresponds to one piece of first indication information, the terminal device performs, based on first indication information corresponding to each piece of UE policy information, a control operation on a corresponding UE policy. For example, if first indication information corresponding to first UE policy information indicates a deleting operation, first indication information corresponding to second UE policy information indicates an overwriting operation, and first indication information corresponding to third UE policy information indicates a maintaining operation, the terminal device performs the deleting, maintaining or overwriting operation respectively on the respective corresponding UE policies.

When at least two pieces of UE policy information correspond to the same piece of first indication information, the terminal device performs, based on one piece of first indication information, the same operation on UE policies corresponding to the at least two pieces of UE policy information. For example, if the first indication information indicates an overwriting operation, the terminal device uses the at least two received UE policies to overwrite the currently stored UE policies.

By using the above-mentioned technical solution, the network identifier is associated with the UE policy information in order to solve the problem with the storage and management of UE policies by the terminal device, and when the network side delivers update information of the UE to the terminal device, the terminal device can perform a deleting or maintaining operation on a first type of UE policy information that is not sent by the terminal. As such, a management operation behavior is defined for the first type of UE policy information and its corresponding UE policy (s).

Embodiment III

Figure 9:
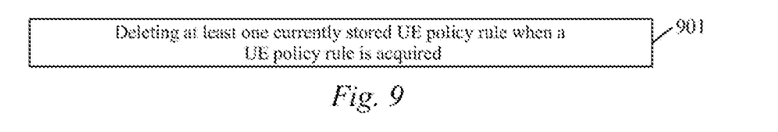
FIG. 9 is a schematic diagram of a third flow of an information processing method in an embodiment of the present application.

In the embodiment of the present application, an information processing method is provided, which is applied to a terminal device, and as shown in FIG. 9, the method specifically comprises:

step 901: deleting at least one currently stored UE policy when a UE policy is acquired.

Based on FIG. 9, the operations performed by the terminal device on UE policies in this embodiment include the following processing methods:

I

If the received UE policy is a UE policy for a first network, and the terminal device only stores UE policies for other networks than the first network, at least a part of UE policy is deleted from at least one of the UE policies for the other networks.

That is to say, if the received UE policy is delivered by the first network and is not stored in the terminal device, a part of currently stored UE policies are deleted.

II

If the received UE policy is a UE policy for a first network, and the terminal device stores a UE policy for at least one network, which comprises the first network, at least a part of UE policy is deleted from the UE policy for the at least one network.

That is to say, if the received UE policy is a rule that has been stored in the terminal device and is delivered by the first network, a part of the currently stored UE policies are likewisely deleted.

Here, the determination of whether the UE policy is for the first network or the second network can be done based on a UE policy section identifier corresponding to the UE policy and a network identifier corresponding to the UE policy section identifier.

In an embodiment of the present application, said acquiring a UE policy comprises: acquiring UE policy information delivered by a network side; and acquiring a UE policy from the UE policy information.

In practical implementations, the UE policy information comprises at least: a UE policy section identifier, and/or at least a part of contents of the UE policy.

Specifically, it can be further divided into the following two cases:

in one aspect, deleting at least a part of UE policy from at least one UE policy for the first network; and in the other aspect, deleting, from the UE policies for the at least one network, at least a part of a UE policy for at least one other network than the first network. Here, when the first network is a home network, and the terminal device acquires a UE policy, only the currently stored UE policy corresponding to the home network is maintained, and some or all of the UE policies corresponding to non-home networks are deleted.

In summary, the received UE policy may comprise any of: a UE policy sent by a new network, or a UE policy that has been stored in the terminal and is sent from a network.

Further, said deleting at least one currently stored UE policy comprises at least one of:

deleting, if the number of UE policies currently stored in the terminal device is greater than a threshold number and/or the volume of UE policies currently stored in the terminal device is greater than a threshold volume, a UE policy that is stored previously and corresponds to at least one network identifier; and deleting, if the number of UE policies currently stored in the terminal device is greater than a threshold number and/or the volume of UE policies currently stored in the terminal device is greater than a threshold volume, at least one UE policy that is stored previously.

Here, the at least one UE policy is deleted based on a deletion condition. In practical applications, the storage of UE policies by a terminal device is done sequentially according to a receiving time order of UE policies for different networks based on network identifiers. For example, the network identifier of a first network corresponds to UE policies of parts 1 to n, the network identifier of a second network corresponds to UE policies of parts n+1 to m, and the network identifier of a third network corresponds to UE policies of parts m+1 to p, which are sequentially stored in the following order: the first network, the second network and the third network, and when the deletion condition is satisfied, the UE policies of parts 1 to n corresponding to the network identifier of the first network are deleted first, then the UE policies of parts n+1 to m corresponding to the network identifier of the second network are deleted, and so on.

Alternatively, the storage of UE policies by a terminal device is done sequentially according to a receiving time order of different UE policies based on the UE policies. For example, the order of the storage is: UE policy 1, UE policy 2 to UE policy n, and when the deletion condition is satisfied, the UE policy 1 is deleted first, then the UE policy 2 is deleted, and so on.

Here, acquiring a UE policy may be receiving a UE policy sent from the currently connected network.

In some embodiments, deleting at least one currently stored UE policy may further comprise:

deleting, if the number of UE policies currently stored in the terminal device is greater than a threshold number and/or the volume of UE policies currently stored in the terminal device is greater than a threshold volume, a UE policy corresponding to a network identifier of at least a second network, or deleting at least one UE policy that is stored previously.

Exemplarily, the first network is a home network, and the second network is a visited network.

That is to say, since a UE policy corresponding to at least one visited network is currently stored in the terminal device, but these visited networks may be networks previously visited by the terminal device and will not be accessed afterwards or in the near future, the storage of these visited networks is undoubtedly a waste of resources. Therefore, when a storage condition is satisfied, the UE policy corresponding to the at least one visited network is deleted first.

Since a home network for a terminal device is a network that the terminal accesses most frequently, deleting a UE policy corresponding to the home network will affect the normal access to the network. Therefore, when the storage condition is satisfied, and the UE policies for the visited networks are deleted, the UE policy for the home network should always be maintained.

Here, in order to facilitate the management of the UE policies, the UE policies are divided so that different networks correspond to their respective UE policies.

Specifically, a UE policy set is currently stored in the terminal device; and the UE policy set comprises: at least one UE policy, and a UE policy section identifier and a network identifier corresponding to each UE policy, wherein one network identifier corresponds to at least one UE policy section identifier; and one UE policy section identifier corresponds to at least one UE policy.

In practical applications, after a UE policy is acquired, the method further comprises: updating UE policies by using the acquired UE policy.

The update principle comprises at least:

if the UE policy section identifier received by the UE has never been stored, adding the UE policy therefor to the UE policy set; if the UE policy section identifier received by the UE has been stored, overwriting the old UE policy content with the new one; and if the content of the UE policy section identifier received by the UE is empty, deleting the corresponding UE policy section identifier.

By using the above-mentioned technical solution, the network identifier is associated with the UE policy information in order to solve the problem with the storage and management of UE policies by the terminal device, and when the network side delivers update information of the UE to the terminal device, the terminal device can perform a specified deleting operation on the currently stored UE policies to delete useless UE policies in the terminal device, thereby reducing the occupation of a storage space, and improving the utilization rate of the storage space.

Embodiment IV

Figure 10:
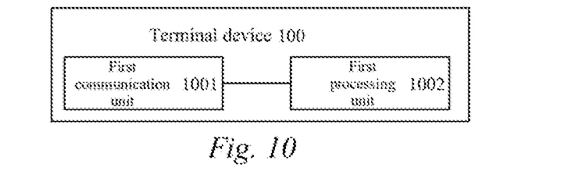
FIG. 10 is a schematic block diagram I of a terminal device in an embodiment of the present application.

In order to implement the method in Embodiment I of the present application, based on the same inventive concept, the embodiment of the present application further provides a terminal device, and as shown in FIG. 10, the terminal device 100 comprises:

a first communication unit 1001 configured to report UE policy information corresponding to at least one network identifier to a network side, wherein the at least one network identifier is a network identifier corresponding to part of UE policy information currently stored in the terminal device.

In some embodiments, the first communication unit 1001 is specifically configured to report UE policy information corresponding to a network identifier of a first network to a network side, wherein the first network is a network currently accessed by the terminal device or a network the terminal device currently requests to access.

In some embodiments, the first communication unit 1001 is further configured to report the UE policy information corresponding to the network identifier of the first network and UE policy information corresponding to a network identifier of a second network to the network side in a roaming scenario.

In some embodiments, the first network is a home network, and the second network is a visited network.

In some embodiments, a UE policy set is currently stored in the terminal device; and the UE policy set comprises: at least one UE policy, and a UE policy section identifier and a network identifier corresponding to each UE policy, wherein one network identifier corresponds to at least one UE policy section identifier; and one UE policy section identifier corresponds to at least one UE policy.

In some embodiments, the first communication unit is specifically configured to report the UE policy information corresponding to the at least one network identifier to the network side, such that the network side updates UE policies stored in the terminal device based on the received UE policy information.

In some embodiments, the UE policy information comprises at least: a UE policy section identifier, and/or at least a part of contents of the UE policy.

In some embodiments, the terminal device further comprises: a first processing unit 1002, wherein the first processing unit 1002 is configured to establish a connection with a first network.

Correspondingly, the first communication unit 1001 is further configured to report the UE policy information corresponding to the at least one network identifier to the network side during the process of establishing a connection with the first network.

In some embodiments, said establishing a connection between the terminal device and the first network comprises at least one of: the terminal device initiating a registration flow, the terminal device initiating a service request flow, the terminal device initiating a UE policy request flow, and the terminal device initiating a PDU session establishment flow.

Embodiment V

Figure 11:
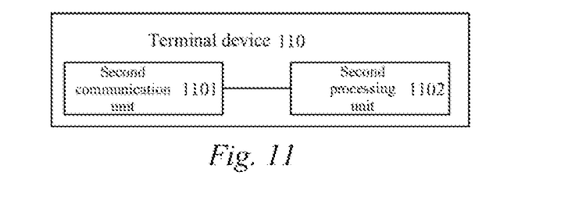
FIG. 11 is a schematic block diagram II of a terminal device in an embodiment of the present application.

In order to implement the method in Embodiment II of the present application, based on the same inventive concept, the embodiment of the present application further provides a terminal device, and as shown in FIG. 11, the terminal device 110 comprises:

a second communication unit 1101 configured to receive at least one piece of UE policy information sent by a network side; and a second processing unit 1102 configured to delete, by the terminal device, a UE policy corresponding to a first type of UE policy information if the at least one piece of UE policy information does not include the first type of UE policy information, or maintaining, by the terminal device, the UE policy corresponding to the first type of UE policy information;

wherein the first type of UE policy information corresponds to at least one UE policy stored in the terminal device.

In some embodiments, the UE policy information further comprises: first indication information, wherein the first indication information is used for indicating a management operation performed on the UE policy(s) corresponding to the UE policy information.

In some embodiments, the second processing unit 1102 is further configured to perform, based on first indication information corresponding to each of the at least one piece of UE policy information, a management operation on a UE policy corresponding to each piece of UE policy information.

In some embodiments, the management operation involves: deleting, overwriting or maintaining.

In some embodiments, an approach of adding the first indication information comprises: adding the first indication information to the UE policy information, with a granularity of a single piece of UE policy information or all of a plurality of pieces of UE policy information.

In some embodiments, the second communication unit 1101 is further configured to receive a first identifier sent by the network side, wherein the first identifier is used for indicating the execution of: deleting, by the terminal device, the UE policy corresponding to the first type of UE policy information; or maintaining, by the terminal device, the UE policy corresponding to the first type of UE policy information.

In some embodiments, the second processing unit 1102 is specifically configured to perform a management operation on at least one UE policy under a network identifier corresponding to the received UE policy information.

Embodiment VI

Figure 12:
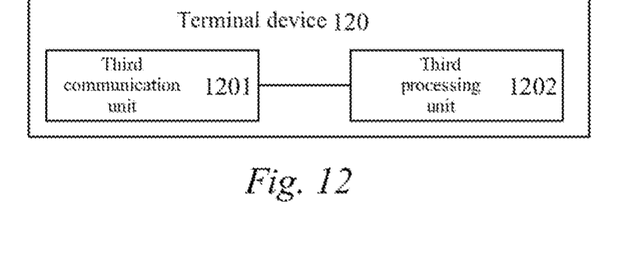
FIG. 12 is a schematic block diagram III of a terminal device in an embodiment of the present application.

In order to implement the method in Embodiment III of the present application, based on the same inventive concept, the embodiment of the present application further provides a terminal device, and as shown in FIG. 12, the terminal device 120 comprises:

a third communication unit 1201 configured to acquire a UE policy from a network side; and a third processing unit 1202 configured to delete at least one currently stored UE policy when the UE policy is acquired.

In some embodiments, the third processing unit 1202 is specifically configured to delete, if the received UE policy is a UE policy for a first network and the terminal device only stores UE policies for other networks than the first network, at least a part of UE policy from at least one of the UE policies for the other networks.

In some embodiments, the third processing unit 1202 is specifically configured to delete, if the received UE policy is a UE policy for a first network and the terminal device stores a UE policy for at least one network which comprises the first network, at least a part of UE policy from the UE policy for the at least one network.

In some embodiments, the third processing unit 1202 is specifically configured to delete at least a part of UE policy from at least one UE policy for the first network.

In some embodiments, the third processing unit 1202 is specifically configured to delete, from the UE policies for the at least one network, at least a part of a UE policy for at least one other network than the first network.

In some embodiments, the third processing unit 1202 is specifically configured to delete, if the number of UE policies currently stored in the terminal device is greater than a threshold number and/or the volume of UE policies currently stored in the terminal device is greater than a threshold volume, a UE policy that is stored previously and corresponds to at least one network identifier; and/or the third processing unit is specifically configured to delete, if the number of UE policies currently stored in the terminal device is greater than a threshold number and/or the volume of UE policies currently stored in the terminal device is greater than a threshold volume, at least one UE policy that is stored previously.

In some embodiments, the third processing unit 1202 is specifically configured to delete, if the number of UE policies currently stored in the terminal device is greater than a threshold number and/or the volume of UE policies currently stored in the terminal device is greater than a threshold volume, a UE policy corresponding to a network identifier of at least a second network, or maintain a UE policy corresponding to a network identifier of a first network, wherein the first network is a home network.

In some embodiments, the first network is a home network, and the second network is a visited network.

In some embodiments, a UE policy set is currently stored in the terminal device; and the UE policy set comprises: at least one UE policy, and a UE policy section identifier and a network identifier corresponding to each UE policy, wherein one network identifier corresponds to at least one UE policy section identifier; and one UE policy section identifier corresponds to at least one UE policy.

Embodiment VII

Figure 13:
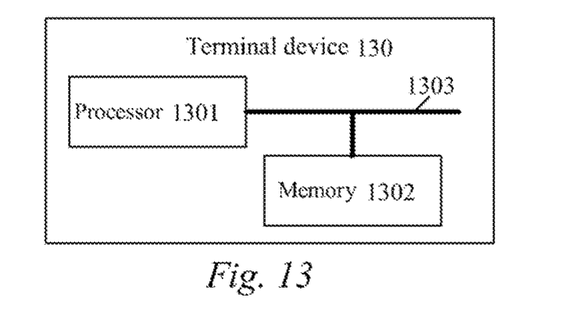
FIG. 13 is a schematic block diagram IV of a terminal device in an embodiment of the present application.

An embodiment of the present application further provides another terminal device, and as shown in FIG. 13, the terminal device 130 comprises: a processor 1301 and a memory 1302 configured to store a computer program capable of running on the processor, wherein the processor 1301 is configured to implement the steps of any of methods in foregoing Embodiments I to III when the computer program is run.

Certainly, in practical applications, as shown in FIG. 13, various components in the terminal device 130 are coupled together via a bus system 1303. It can be appreciated that the bus system 1303 is used to implement connections and communications among these components. The bus system 1303 further comprises, in addition to a data bus, a power bus, a control bus and a status signal bus. However, for clarity of illustration, various buses are all labeled as the bus system 1303 in FIG. 13.

Figure 14:
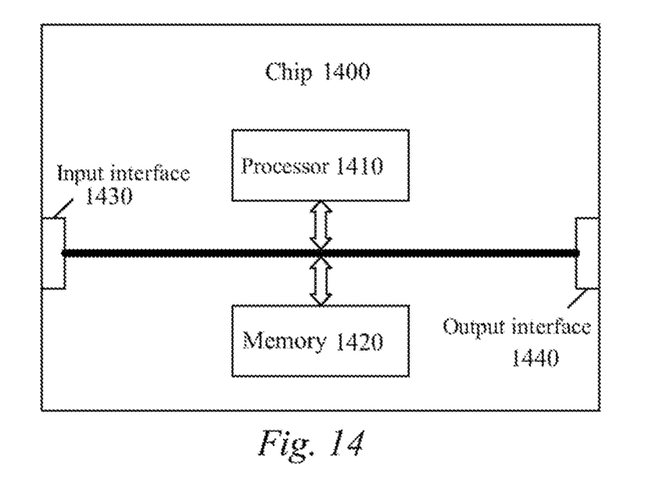
FIG. 14 is a schematic block diagram of a chip provided in an embodiment of the present application.

FIG. 14 is a schematic structural diagram of a chip of an embodiment of the present application. The chip 1400 shown in FIG. 14 comprises a processor 1410, and the processor 1410 may invoke and run a computer program from a memory, so as to implement the method in the embodiment of the present application.

Alternatively, as shown in FIG. 14, the chip 1400 may further comprise a memory 1420. The processor 1410 may invoke and run a computer program from the memory 1420, so as to implement the method in the embodiment of the present application.

The memory 1420 may be a separate device independent of the processor 1410, or may be integrated into the processor 1410.

Alternatively, the chip 1400 may further comprise an input interface 1430. The processor 1410 may control the input interface 1430 to communicate with other devices or chips, which, specifically, makes it possible to acquire information or data sent by other devices or chips.

Alternatively, the chip 1400 may further comprise an output interface 1440. The processor 1410 may control the output interface 1440 to communicate with other devices or chips, which, specifically, makes it possible to output information or data to other devices or chips.

Alternatively, the chip may be applied to the network device in the embodiments of the present application, and can implement corresponding flows, which are implemented by the network device, in various methods of the embodiments of the present application, which will not be repeatedly described herein for brevity.

Alternatively, the chip may be applied to the terminal device in the embodiments of the present application, and can implement corresponding flows, which are implemented by the terminal device, in various methods of the embodiments of the present application, which will not be repeatedly described herein for brevity.

It should be appreciated that the chip mentioned in the embodiments of the present application may also be referred to as system-level chip, system chip, chip system, or system-on-chip, etc.

Figure 15:
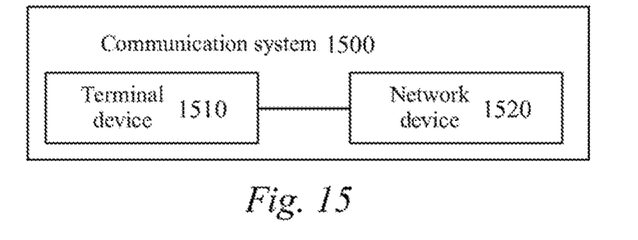
FIG. 15 is a schematic block diagram of a communication system architecture provided in an embodiment of the present application.

FIG. 15 is a schematic block diagram of a communication system 1500 provided in an embodiment of the present application. As shown in FIG. 15, the communication system 1500 comprises a terminal device 1510 and a network device 1520.

The terminal device 1510 may be used to implement the corresponding function in the above method that is implemented by the terminal device, and the network device 1520 may be used to implement the corresponding function in the above-mentioned method that is implemented by the network device, which will not be repeatedly described herein for brevity.

It should be appreciated that the processor in the embodiment of the present application may be an integrated circuit chip with a signal processing capability. During the implementation, various steps in the method embodiment described above may be completed by an integrated logic circuit of hardware components or by instructions in the form of software in a processor. The processor described above may be a general-purpose processor, a digital signal processor (DSP), an application specific integrated circuit (ASIC), a field programmable gate array (FPGA), or other programmable logic devices, discrete gates or transistor logic devices, or discrete hardware components. The methods, steps, and logic block diagrams disclosed in the embodiments of the present application may be implemented or carried out. The general-purpose processor may be a microprocessor, or the processor may also be any conventional processor, etc. The steps of the method disclosed in the embodiment of the present application may be directly embodied as being implemented by a hardware decoding processor, or by a combination of hardware and software modules in the decoding processor. The software module may be located in a mature storage medium in the art, such as a random access memory, a flash memory, a read-only memory, a programmable read-only memory or an electrically erasable programmable memory, and a register. The storage medium is located in a memory, and a processor reads information in the memory and completes the steps of the method above in combination with the hardware components thereof.

It can be appreciated that the memory in the embodiments of the present application may be a volatile memory or a non-volatile memory, or may comprise both the volatile and non-volatile memories. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM) that acts as an external cache. By way of the exemplary but not restrictive illustration, many forms of RAMs are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM). It should be noted that the memory for the system and method described herein is intended to include, but is not limited to, these and any other suitable types of memories.

The embodiment of the present application further provides a computer readable storage medium for storing a computer program.

Alternatively, the computer readable storage medium may be applied to the terminal device in the embodiments of the present application, and the computer program causes a computer to implement corresponding flows, which are implemented by the mobile terminal/terminal device, in various methods of the embodiments of the present application, which will not be repeatedly described herein for brevity.

The embodiment of the present application further provides a computer program product, which comprises computer program instructions.

Alternatively, the computer program product may be applied to the mobile terminal/terminal device in the embodiments of the present application, and the computer program instructions cause a computer to implement corresponding flows, which are implemented by the mobile terminal/terminal device, in various methods of the embodiments of the present application, which will not be repeatedly described herein for brevity.

The embodiment of the present application further provides a computer program.

Alternatively, the computer program may be applied to the mobile terminal/terminal device in the embodiments of the present application, and the computer program causes, when run on a computer, the computer to implement corresponding flows, which are implemented by the mobile terminal/terminal device, in various methods of the embodiments of the present application, which will not be repeatedly described herein for brevity.

Those of ordinary skills in the art may be aware that the units and algorithm steps of various examples described in conjunction with the embodiments disclosed herein can be implemented in electronic hardware or a combination of computer software and electronic hardware. Whether these functions are performed in hardware or software depends on the specific application and design constraints of the technical solution. A professional technician can use different methods for each specific application to implement the described functions, but such implementation should not be considered to be beyond the scope of the present application.

A person skilled in the art can clearly understand that, for the convenience and brevity of the description, references can be made to the corresponding process in the foregoing method embodiment for the specific working process of the system, device and unit described above, which will not be repeatedly described herein.

In addition, various functional units in various embodiments of the present application may be integrated into one processing unit, or various units may be physically present separately, or two or more units may be integrated into one unit.

The functions, if implemented in the form of a software functional unit and sold or used as an independent product, may be stored in a computer readable storage medium. Based on such understanding, the technical solution of the present application, in essence, or its contribution to the prior art, or part of the technical solution may be embodied in the form of a software product. The computer software product is stored in a storage medium, and includes several instructions used to cause a computer device (which may be a personal computer, a server, or a network device, etc.) to perform all or some of the steps of the method in various embodiments of the present application. Moreover, the aforementioned storage medium comprises: a USB flash disk, a mobile hard disk drive, a read-only memory (ROM), a random access memory (RAM), a magnetic disk or a compact disc or other various media capable of storing program codes.

The foregoing descriptions are merely specific embodiments of the present application, but the protection scope of the present application is not limited thereto, and any variation or replacement readily conceived by persons skilled in the art within the technical scope disclosed in the present application shall fall within the protection scope of the present application. Therefore, the protection scope of the present application should be defined by the protection scope of the claims.

The invention claimed is:

1. An information processing method, which is applied to a terminal device, the method comprising:
reporting at least one Public Land Mobile Network (PLMN) identifier and respective UE policy information corresponding to each of the at least one PLMN identifier to a network side policy control function (PCF),
wherein the at least one PLMN identifier is a part of all PLMN identifiers which are stored in the terminal device, and the reported UE policy information corresponding to the at least one PLMN identifier is a part of all pieces of UE policy information which are currently stored in the terminal device,
said reporting at least one PLMN identifier and respective UE policy information corresponding to each of the at least one PLMN identifier to the network side PCF comprises: reporting a PLMN identifier of a first network and UE policy information corresponding to the PLMN identifier of the first network to the network side PCF, wherein the first network is a network currently accessed by the terminal device or a network the terminal device currently requests to access; or
said reporting at least one PLMN identifier and respective UE policy information corresponding to each of the at least one PLMN identifier to the network side PCF comprises at least one of: reporting a PLMN identifier of a first network and a PLMN identifier of a second network, and UE policy information corresponding to the PLMN identifier of the first network and UE policy information corresponding to the PLMN identifier of the second network to the network side PCF, wherein the first network is a home network, and the second network is a visited network,
wherein the at least one PLMN identifier and respective UE policy information corresponding to each of the at least one PLMN identifier are reported to the network side PCF during a process of establishing a connection with the first network, and the establishing the connection with the first network comprises at least one of: the terminal device initiating a service request flow, the terminal device initiating a UE policy request flow, and the terminal device initiating a PDU session establishment flow.

2. The method of claim 1, wherein a UE policy set is currently stored in the terminal device; and
the UE policy set comprises: at least one UE policy, and a UE policy section identifier and a PLMN identifier corresponding to each UE policy;
wherein one PLMN identifier corresponds to at least one UE policy section identifier; and one UE policy section identifier corresponds to at least one UE policy.

3. The method of claim 1, wherein the reporting at least one PLMN identifier and respective UE policy information corresponding to each of the at least one PLMN identifier to the network side PCF comprises: reporting the at least one PLMN identifier and the respective UE policy information corresponding to each of the at least one PLMN identifier to the network side PCF, such that the network side PCF updates the UE policies stored in the terminal device based on the received UE policy information.

4. The method of claim 1, wherein the UE policy information comprises at least: a UE policy section identifier, and/or at least a part of contents of the UE policy.

5. A terminal device, comprising a processor, and a memory configured to store a computer program capable of running on the processor, wherein the processor is configured to execute the computer program to:
report at least one Public Land Mobile Network (PLMN) identifier and respective UE policy information corresponding to each of the at least one PLMN identifier to a network side policy control function (PCF),
wherein the at least one network identifier is a part of all network identifiers which are stored in the terminal device, and the reported UE policy information corresponding to the at least one network identifier is a part of all pieces of UE policy information which are currently stored in the terminal device,
wherein the processor is further configured to execute the computer program to: report a PLMN identifier of a first network and UE policy information corresponding to the PLMN identifier of the first network to the network side PCF, wherein the first network is a network currently accessed by the terminal device or a network the terminal device currently requests to access; or
wherein the processor is configured to execute the computer program to report a PLMN identifier of a first network and a PLMN identifier of a second network, and UE policy information corresponding to at least one of the PLMN identifier of the first network and the PLMN identifier of the second network to the network side PCF, wherein the first network is a home network, and the second network is a visited network,
wherein the processor is further configured to execute the computer program to report at least one network identifier and respective UE policy information corresponding to each of the at least one PLMN identifier to the network side PCF during a process of establishing a connection with the first network, and the process of establishing the connection with the first network comprises at least one of: the terminal device initiating a service request flow, the terminal device initiating a UE policy request flow, and the terminal device initiating a PDU session establishment flow.

6. The terminal device of claim 5, wherein a UE policy set is currently stored in the terminal device; and
the UE policy set comprises: at least one UE policy, and a UE policy section identifier and a PLMN identifier corresponding to each UE policy;
wherein one PLMN identifier corresponds to at least one UE policy section identifier; and one UE policy section identifier corresponds to at least one UE policy.

7. The terminal device of claim 5, wherein the processor is configured to execute the computer program to:
report the at least one PLMN identifier and the respective UE policy information corresponding to each of the at least one PLMN identifier to the network side PCF, such that the network side PCF updates the UE policies stored in the terminal device based on the received UE policy information.

8. The terminal device of claim 5, wherein the UE policy information comprises at least: a UE policy section identifier, and/or at least a part of contents of the UE policy.

* * * * *